United States Patent [19]

Beekenkamp

[11] 4,062,390

[45] Dec. 13, 1977

[54] ARRANGEMENT FOR CUTTING A WORKPIECE

[75] Inventor: Gerald Beekenkamp, Etobicoke, Canada

[73] Assignee: The Black and Decker Manufacturing Company, Towson, Md.

[21] Appl. No.: 713,631

[22] Filed: Aug. 12, 1976

[51] Int. Cl.$^2$ .......................... B27C 5/02; B27C 5/10
[52] U.S. Cl. .............................. 144/134 D; 30/376; 33/75 R; 33/120; 83/471.2; 83/486.1; 83/745; 90/12 D; 144/286 R
[58] Field of Search ............... 30/376; 376/75 R, 120; 90/DIG. 3, 12 D, 15; 83/486, 486.1, 471, 743, 744, 745, 471.2, 471.3; 144/286 R, 286 A, 288 R, 288 C, 134 R, 134 D, 136 D

[56] References Cited

U.S. PATENT DOCUMENTS

| | | | |
|---|---|---|---|
| 2,541,508 | 2/1951 | Fleming | 144/286 R |
| 2,725,904 | 12/1955 | Broster et al. | 83/486.1 |
| 2,735,455 | 2/1956 | Forsberg | 83/745 |
| 2,739,624 | 3/1956 | Haddock | 83/486.1 |
| 2,822,834 | 2/1958 | Hammers | 33/75 R X |
| 3,450,001 | 6/1969 | Fortune | 144/136 C X |
| 3,586,077 | 6/1971 | Pease | 30/376 |
| 3,645,307 | 2/1972 | Stocker | 30/376 |
| 3,915,045 | 10/1975 | Kitzman | 30/376 |
| 3,991,443 | 11/1976 | Girardin | 83/486.1 X |

Primary Examiner—Harrison L. Hinson
Assistant Examiner—W. D. Bray
Attorney, Agent, or Firm—Walter Ottesen; Edward D. Murphy; Leonard Bloom

[57] ABSTRACT

The invention is directed to an arrangement for cutting a workpiece with a portable tool such as a circular saw, router or the like and includes a supporting structure and a pair of elongated vise members mounted on the supporting structure. The vise members are disposed in side by side relation to each other and define a substantially smooth upper surface upon which the workpiece can be placed. At least one of the vise members is mounted on supporting structure so as to be movable relative to the other one of the vise members. An elongated track member defines the cutting path and is adapted for insertion between the vise members. A clamping arrangement is included for adjusting the vise members with respect to each other to clamp the track member therebetween. An elongated workpiece guide arm is pivotally mounted to the track member for angularly positioning the workpiece in the path defined by the track member. A mounting sled slideably engages the track member for movement therealong and is adapted to receive the portable tool thereon so as to cause the cutting element of the tool to be movable with the sled along the cutting path and into the workpiece.

31 Claims, 7 Drawing Figures

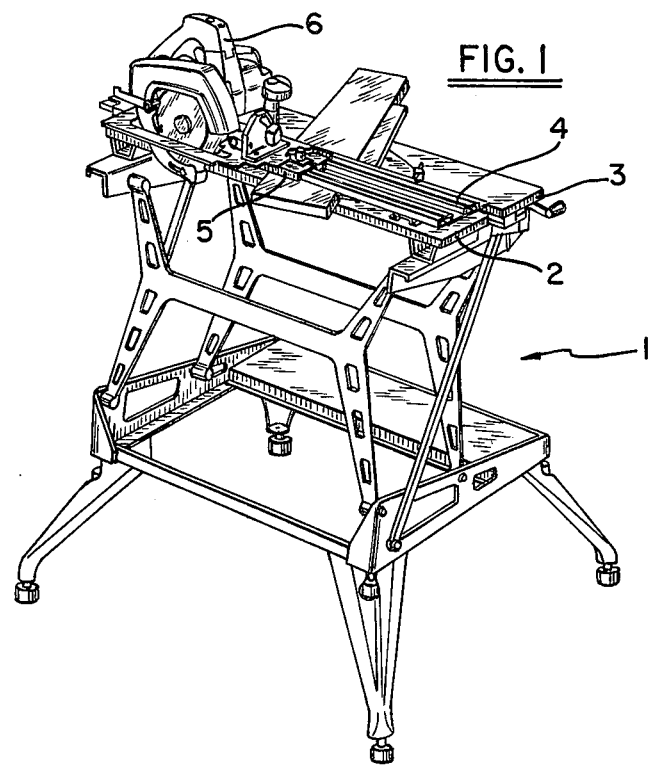
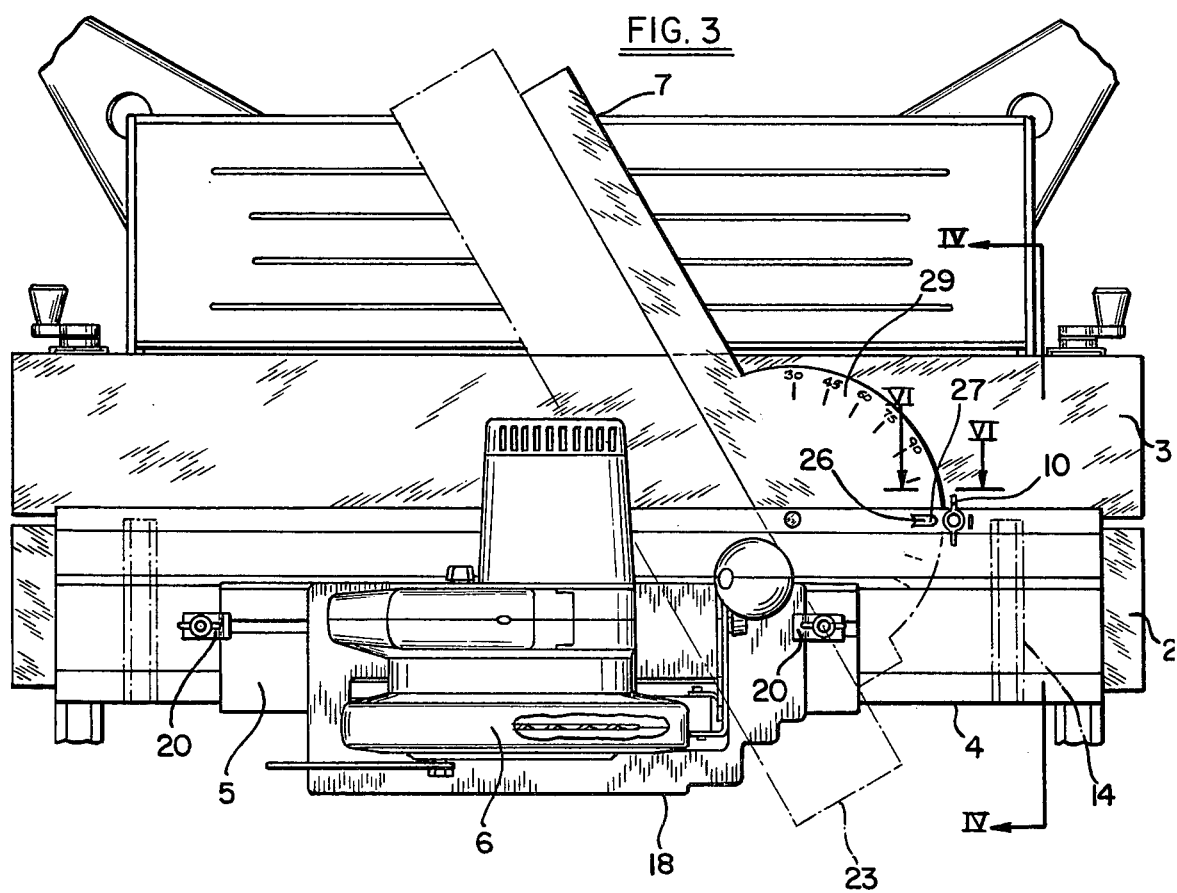

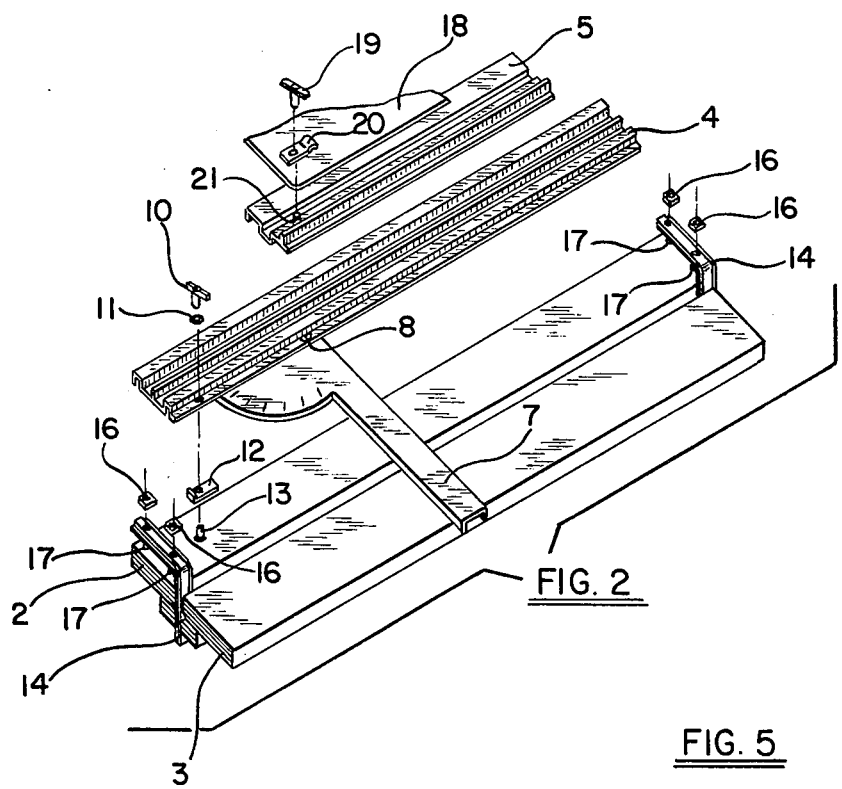
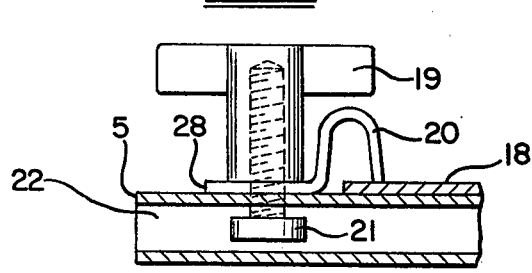
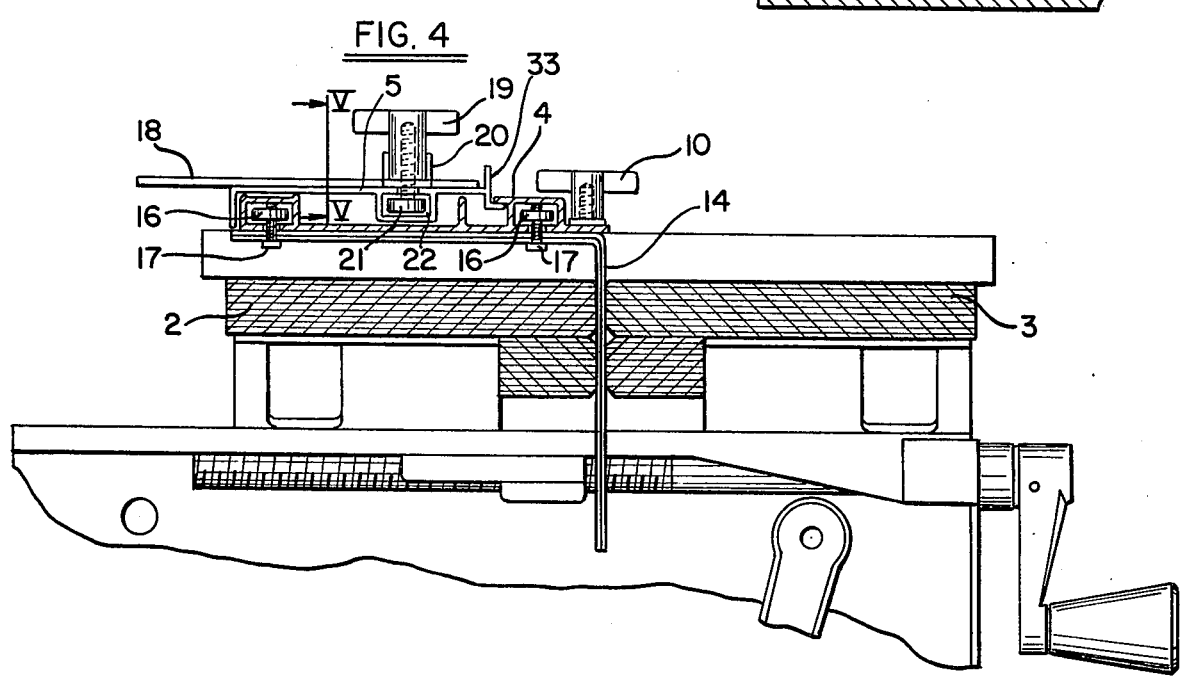

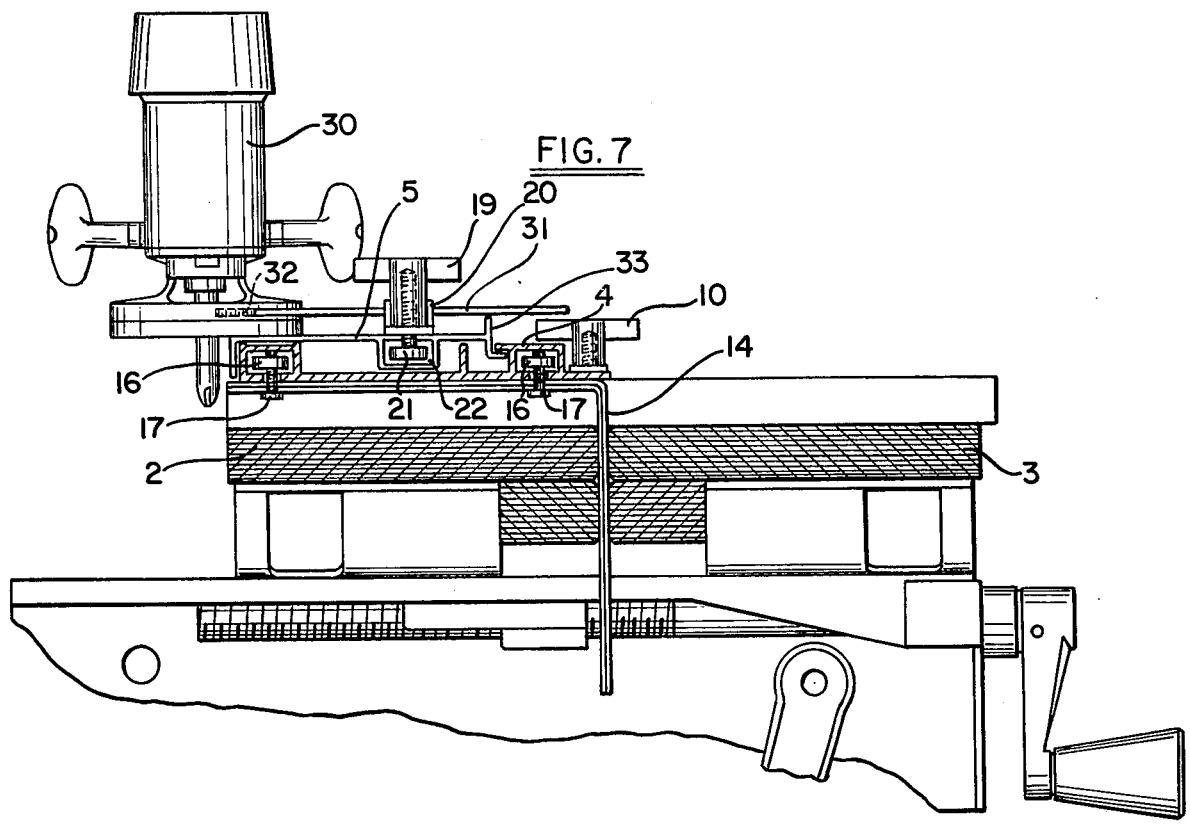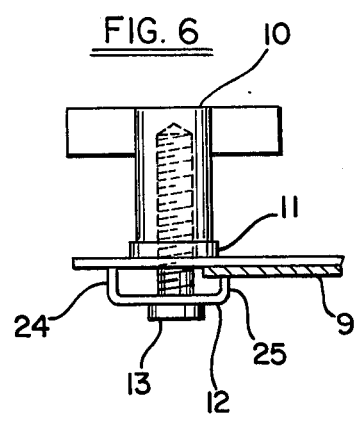

ARRANGEMENT FOR CUTTING A WORKPIECE

BACKGROUND OF THE INVENTION

The invention relates to an arrangement for cutting a workpiece with a portable tool such as a circular saw, router or the like. With my invention, a workpiece can be easily cut at a desired angle.

Arrangements for cutting a workpiece are suggested by the prior art as shown, for example, by U.S. Pat. No. 3,586,077. In this patent, there is shown an arrangement wherein there is provided a main bar of sufficient length to permit the same to be engaged over a workpiece which is to be cut. The main bar is secured to the workpiece with the aid of fastening clamps. A tracking shoe slideably engages an extending rail formed on the main bar 12 and is adapted for receiving a portable saw thereon. When the workpiece to which the main bar is clamped is to be cut, the power saw is moved longitudinally along the rail of the main bar and the circular saw blade of the power saw will then make the cut in the workpiece as the saw is moved along.

As a second embodiment of U.S. Pat. No. 3,586,077 includes, a protractor which is fixedly mounted to the rail and a protractor bar. This embodiment of the arrangement enables the main bar to be clamped to a workpiece at a desired angle thereby enabling a cut to be made at a desired angle.

The foregoing arrangement is not amenable to a quick cutting operation and always requires that the arrangement itself be physically positioned and clamped onto the workpiece to be cut. This makes the arrangement quite cumbersome for the operator and also can result in undesirable abrasion to the workpiece because of the fastening clamps that are needed to hold the arrangement to the workpiece being cut.

SUMMARY OF THE INVENTION

Accordingly, it is an object of my invention to provide an arrangement for cutting a workpiece with a portable tool wherein the workpiece can be easily aligned with respect to the cutting path and the cutting operation performed simply and quickly and without abrading the workpiece.

It is another object of my invention to provide such an arrangement which facilitates performing a cutting operation on a workpiece with a circular saw as well as with a router, and wherein a high accuracy of the cutting angle is achieved.

The arrangement for cutting a workpiece according to my invention is suitable for use with a portable tool such as a circular saw, router, or the like and a supporting structure having mounted thereon a pair of elongated vise members which are mutually clampable and disposed in side by side relation to each other. The vise members define a substantially smooth upper surface upon which the workpiece can be placed. The arrangement includes an elongated track member which defines a cutting path and is adapted for insertion between the vise members. An elongated workpiece guide arm is pivotally mounted to the track member for angularly positioning the workpiece in the path defined by the track member and a mounting sled slideably engages the track member for movement therealong. The mounting sled is adapted to receive the portable tool thereon so as to cause the cutting element of the tool to be movable with the sled along the path and into the workpiece.

In another embodiment of the arrangement according to my invention, I include as a feature a supporting structure as well as a pair of elongated vise members mounted on the supporting structure and disposed in a side by side relation to each other. The vise members define a substantially smooth upper surface upon which the workpiece can be placed and at least one of the vise members is mounted on the supporting structure so as to be movable relative to the other one of the vise members. An elongated track member defines a cutting path and is adapted for insertion between the vise members. An elongated workpiece guide arm is pivotally mounted to the track member for angularly positioning the workpiece in the cutting path defined by the track member. Also, the mounting sled slideably engages the track member for movement therealong and is adapted to receive the portable tool thereon so as to cause the cutting element of the tool to be movable with the sled along the path and into the workpiece.

According to still another embodiment of my invention, the portable electric tool can itself constitute part of the arrangement and is mounted on the mounting sled so that the cutting element of the tool is movable with the sled along the path and into the workpiece.

The above embodiments can also incorporate angle indicating means in the form of a protractor on the elongated guide arm for indicating the angular position of the guide arm with respect to the cutting path. When a workpiece is held against the guide arm, it will be cut at the angle at which the operator has adjustably secured the guide arm.

The arrangement for cutting a workpiece according to my invention is especially suitable for use with a work bench of the kind described in the copending application, Ser. No. 277,124 of Ronald Price Hickman filed Aug. 1, 1972, and now abandoned, which is an improvement of his basic work bench disclosed in U.S. Pat. No. 3,615,087. The work bench disclosed in the above-mentioned patent application and patent includes elongated vise members having a smooth upper surface and are especially suitable for clamping the elongated track member therein.

The work bench corresponding to the work bench disclosed in U.S. Pat. No. 3,615,087 as modified according to the above-mentioned copending application is available in the United States and abroad and is manufactured and sold by The Black and Decker Manufacturing Company of Towson, Md. as the "WORKMATE" All-Purpose Work Center and Vise.

The objectives and advantages of my invention will become more apparent from a consideration of the detailed description to follow taken in conjunction with the drawings annexed hereto.

BRIEF DESCRIPTION OF THE DRAWING

FIG. 1 is a perspective view of the arrangement for cutting a workpiece according to my invention;

FIG. 2 is an exploded view showing the alignment and parts making up the invention;

FIG. 3 is a plan view of the arrangement according to my invention wherein a portable electric tool in the form of a circular saw is mounted upon the mounting sled;

FIG. 4 is a section view taken along line IV—IV of FIG. 3 and illustrates how the mounting sled slideably engages the elongated track member; this view shows only the shoe of the circular saw shown in FIG. 3;

FIG. 5 is an exploded fragmentary section view taken along line V—V of FIG. 4 and shows how the shoe of a circular saw is secured to the mounting sled;

FIG. 6 is an exploded fragmentary view taken along line VI—VI of FIG. 3 and shows the means for adjustably securing the guide arm with respect to the track member at a desired angle; and, FIG. 7 illustrates how the arrangement according to my invention can incorporate a portable tool in the form of a router for cutting a workpiece.

DESCRIPTION OF THE PREFERRED EMBODIMENTS OF THE INVENTION

FIG. 1 shows a workbench having a supporting structure 1 and elongated vise members 2 and 3 mounted on the supporting structure 1. An elongated track member 4 is clamped between the elongated vise members 2 and 3 and the mounting sled 5 slideably engages the track member 4. Upon the mounting sled 5 is mounted a portable electric tool in the form of a circular saw 6.

Referring now to FIG. 2, wherein an exploded view of the parts making up the arrangement according to the invention are shown, the elongated track member 4 is provided with an elongated workpiece guide arm 7 which is pivotally mounted to the elongated track member 4 by means of a pivot pin 8. The guide arm 7 includes a protractor portion 9. The protractor portion 9 and guide arm 7 can be made up as a single element by means of metal stamping. If desired, however, portion 7 can be an extruded member and the protractor 9 attached thereto with suitable fasteners. Adjustable securing means in the form of wingnut 10, washer 11, bracket 12 and threaded bolt 13 are provided for securing the guide arm 7 with respect to the track member 4.

The track member 4 can include bracket arms 14 for holding the track member in spaced relation above the upper work surface defined by vise members 2 and 3. The bracket arms 14 are mounted to the track member 4 with the aid of fasteners made up by nut 16 and bolt 17. FIG. 2 also shows a portion of the shoe 18 of a circular saw which is held to the mounting sled with the aid of wingnut 19, holding bracket 20 and T-shaped bolt 21.

FIG. 3 shows a plan view of the arrangement according to the invention wherein the portable tool utilized is a circular electric saw 6 equipped with a shoe 18. The shoe 18 is held to the mounting sled 5 with the aid of the holding brackets 20.

As best shown in FIG. 4, the mounting means for holding the portable tool to the mounting sled includes a channel recess means 22 formed in the mounting sled 5 and T-headed bolts 21 which slideably engage the recess means so as to be held in place against rotation when the wingnut 19 is tightened to secure holding bracket 20 for engaging and holding the shoe 18 of the portable tool.

Returning to FIG. 3, it is noted that the elongated track member 4 defines the cutting path for the cutting tool which can be, for example, a No. 3047-09 SUPER SAWCAT Saw manufactured and sold by The Black and Decker Manufacturing Company of Towson, Md. The mounting sled 5 slideably engages the track member 4 for movement therealong and receives the portable tool thereon so as to cause the cutting element which here is a circular blade to be movable with the sled along the path and into the workpiece shown in phantom and identified by reference numeral 23. With the mounting brackets 14 clamped between the vise members 2 and 3, the track member 4 can be arranged at any desired height to accommodate a workpiece having a given thickness. The guide arm 7 is secured at the angle at which it is desired to cut the workpiece by tightening the wingnut 10. The wingnut 10 constitutes part of the adjustable securing means which is shown in detail in FIG. 6.

Referring to FIG. 6, it is noted that the bracket 12 is a U-shaped member having leg portions 24 and 25. When the wingnut 19 is tightened, the bolt 13 draws the bracket 12 upwardly against the track member 4 at leg 24 and leg 25 presses the protractor portion 9 against the lower surface of the track thereby securing the guide arm with respect to the track member 4 at the desired angle.

Indicating means is shown in FIG. 3 in the form of arrow 26 and window 27 which indicates to the operator at which angle he has set his guide arm 7. Through the window 27, the operator can see the scale marks 29 on the protractor.

Referring now to FIG. 5, there is shown as enlarged view of a portion of the mounting means for holding the portable tool to the mounting sled. This view is taken along line V—V of FIG. 4. The mounting means includes the holding bracket 20 which has a U-shaped form with a tab 28 extending off one of the legs thereof. The other leg holds down the portable tool which here is a circular saw having a shoe 18. The remaining reference numerals in FIG. 5 correspond to other elements of the mounting means discussed previously in connection with FIG. 4.

The track member 4, the guide arm 7 and the upper surface of the vise members 2 and 3 conjointly define a partially bounded space wherein the workpiece 23 can be held with respect to the cutting path. In preparing the arrangement according to the invention for cutting a workpiece, the operator sets the guide arm 7 at the angle at which the workpiece 23 is to be cut and tightens the wingnut 10 to secure the guide arm 7 to the track member 4. The workpiece 23 is then slipped underneath the track member 4 so that it snugs up to the guide arm 7. The track member 4 is lowered in the vise members 2 and 3 to the workpiece until the same is contacted. It is desirable to lean on the track member 4 slightly to ensure that the workpiece is firmly held. It is good practice for the operator to also manually hold the workpiece at the side of the track member 4 away from the saw blade. While leaning on the track member 4 slightly, the operator clamps the track member 4 by clamping the brackets 14 between the vise members 2 and 3. The operator then moves the circular saw 6 and sled 16 along the track member 4 to cut the workpiece 23 at the preset angle.

According to a subsidiary embodiment of my invention, texture means can be formed on the base of the track member 4 for frictionally engaging the workpiece when the track member is lowered with respect to the upper surface of the vise members 2 and 3. The texture means can be achieved by slightly roughing the undersurface of track member 4.

The arrangement according to my invention is also suitable for use with a portable electric tool in the form of a router having a mounting attachment including two metal bars.

FIG. 7 is an elevation view partially in section taken along line IV—IV of FIG. 3. However, here a router has been substituted for the circular saw. The router 30 can, for example, be a two horsepower CYCLONE router No. 3320 manufactured and sold by The Black and Decker Manufacturing Company of Towson, Md. The metal bars 31 threadably engage threaded bores 32 in the router. The router is held on the mounting sled 16 so that the router bit extends out into the cutting path defined by the elongated track member 4. The holding brackets shown in FIG. 5 are especially versatile in that they can be utilized to hold both the shoe of a portable electric saw as well as the metal bars of a router. The U-shaped portion of the holding bracket 20 hook over and engage the metal bars respectively for securely holding the router to the sled. The bars 31 are braced on a ridge-like extension 33 of the mounting sled 5.

In the above embodiments, the track member 4 and the mounting sled 16 are preferably made of aluminum extrusions.

Attention is called to the fact that my invention is not necessarily limited to a workbench having clampable vise members but can be used with a structure defining a work surface by suitably mounting the elongated track member in spaced relation above the work surface so that the workpiece may be accommodated thereunder.

I claim:

1. An arrangement for cutting a workpiece with a portable tool such as a circular saw, router or the like comprising:
   a supporting structure;
   a pair of elongated vise members mounted on said supporting structure and disposed in side by side relation to each other, said vise members defining a substantially smooth upper surface upon which the workpiece can be placed and at least one of said vise members being mounted on said supporting structure so as to be movable relative to the other one of said vise members;
   an elongated track member defining a cutting path;
   clamping means for adjusting said one movable vise member toward or away from the other one of said vise members to clamp said track member therebetween;
   an elongated workpiece guide arm pivotally mounted to said track member for angularly positioning the workpiece in said path defined by said track member;
   a mounting sled slideably engaging said track member for movement therealong and being adapted to receive the portable tool thereon so as to cause the cutting element of the tool to be movable with said sled along said path and into the workpiece; and
   supporting means insertable between said vise members for supporting said track member in spaced relation above said vise members, said track member, said guide arm and said vise members conjointly defining partially bounded space wherein the workpiece can be held with respect to said cutting path.

2. The arrangement of claim 1 comprising: angle indicating means for indicating the angular position of said guide arm with respect to said cutting path.

3. The arrangement of claim 2 comprising adjustable securing means for adjustably securing said guide arm with respect to said track member at a desired angle.

4. The arrangement of claim 3, said angle indicating means including: a protractor on said guide arm for rotating therewith to provide an angle indication of the angular position of said guide arm with respect to said track member and said cutting path.

5. The arrangement of claim 4, said angle indicating means including: an indicator formed on said track member for indicating the angle on said protractor which said guide arm makes with respect to said cutting path.

6. The arrangement of claim 4, said supporting means comprising brackets mounted on said track member at respective end portions thereof, said brackets being configured for insertion and clamping between said vise members to support said track member in spaced relation above said vise members; said track member, said guide arm and said vise members conjointly defining said partially bounded space wherein the workpiece can be held with respect to said cutting path.

7. The arrangement of claim 6 comprising: texture means formed on the base of said track member for frictionally engaging the workpiece when said track member is lowered with respect to said upper surface to firmly hold the workpiece in said cutting path.

8. The arrangement of claim 6 comprising: mounting means for holding the portable tool to said mounting sled, said mounting means comprising:
   channel recess means formed in said mounting sled;
   fasteners having a T-type head adapted for engaging said recess means with the head portion thereof so as to cause the remaining portion thereof to extend upwardly from the top surface of said mounting sled; and,
   holding brackets held to said sled by said fasteners for engaging and holding the tool securely to said sled.

9. The arrangement of claim 8 wherein the portable tool for the arrangement is a router having a mounting attachment including two metal bars, said mounting sled having a ridge portion formed thereon on which the metal bars can be braced, said last-mentioned brackets being U-shaped to hook over and engage the metal bars, respectively, for securely holding the router to said sled.

10. The arrangement of claim 9 wherein a circular saw having a shoe is substituted for the router, said U-shaped brackets having one leg shorter than the other leg, said shorter leg being adapted to engage and hold the shoe securely to the sled.

11. An arrangement for cutting a workpiece comprising:
   a supporting structure;
   a pair of elongated vise members mounted on said supporting structure and disposed in side by side relation to each other, said vise members defining a substantially smooth upper surface upon which the workpiece can be placed and at least one of said vise members being mounted on said supporting structure so as to be movable relative to the other one of said vise members;
   an elongated track member defining a cutting path;
   clamping means for adjusting said one movable vise member toward or away from the other one of said vise members to clamp said track member therebetween;
   an elongated workpiece guide arm pivotally mounted to said track member for angularly positioning the workpiece in said path defined by said track member;
   a cutting tool having a cutting element;
   a mounting sled slideably engaging said track member for movement therealong and being adapted to receive the portable tool thereon so as to cause said cutting element of said tool to be movable with said sled along said path and into the workpiece; and, supporting means insertable between said vise members for supporting said track member in spaced relation above said vise members, said track member, said guide arm and said vise members conjointly defining a partially bounded space wherein the workpiece can be held with respect to said cutting path.

12. The arrangement of claim 11 comprising: angle indicating means for indicating the angular position of said guide arm with respect to said cutting path.

13. The arrangement of claim 12 comprising adjustable securing means for adjustably securing said guide arm with respect to said track member at a desired angle.

14. The arrangement of claim 13, said angle indicating means including: a protractor on said guide arm for rotating therewith to provide an angle indication of the angular position of said guide arm with respect to said track member and said cutting path.

15. The arrangement of claim 14, said angle indicating means including: an indicator formed on said track member for indicating the angle on said protractor which said guide arm makes with respect to said cutting path.

16. The arrangement of claim 14, said supporting means comprising brackets mounted on said track member at respective end portions thereof, said brackets being configured for insertion and clamping between said vise members to support said track member in spaced relation above said vise members; said track member, said guide arm and said vise members conjointly defining said partially bounded space wherein the workpiece can be held with respect to said cutting path.

17. The arrangement of claim 16 comprising: texture means formed on the base of said track member for frictionally engaging the workpiece when said track member is lowered with respect to said upper surface to firmly hold the workpiece in said cutting path.

18. The arrangement of claim 16 comprising: mounting means for holding said portable tool to said mounting sled, said mounting means comprising:
channel recess means formed in said mounting sled;
fasteners having a T-type head adapted for engaging said recess means with the head portion thereof so as to cause the remaining portion thereof to extend upwardly from the top surface of said mounting sled; and,
holding brackets held to said sled by said fasteners for engaging and holding said tool securely to said sled.

19. The arrangement of claim 18, said portable tool being a circular saw having a shoe, said last-mentioned brackets being configured to engage said shoe for securely holding said saw to said sled.

20. The arrangement of claim 18, said portable tool being a router having an attachment including two metal bars extending from said router, said last-mentioned brackets being configured to engage said bars, respectively, for securely holding said router to said sled.

21. The arrangement of claim 20, said mounting sled having a ridge portion formed thereon on which said metal bars can be braced, said last-mentioned brackets being U-shaped to hook over and engage said metal bars, respectively, for securely holding said router to said sled.

22. An arrangement for cutting a workpiece with a portable tool such as a circular saw, a router and a workbench having a pair of mutually clampable elongated vise members disposed in side by side relation to each other, the vise members defining a substantially smooth upper surface upon which the workpiece can be placed, the arrangement comprising:
an elongated track member defining a cutting path;
an elongated workpiece guide arm pivotally mounted to said track member for angularly positioning the workpiece in said path defined by said track member;
a mounting sled slideably engaging said track member for movement therealong and being adapted to receive the portable tool thereon so as to cause the cutting element of the tool to be movable with said sled along said path and into the workpiece; and,
supporting means insertable between said vise members for supporting said track member in spaced relation above said vise members, said track member, said guide arm and said vise members conjointly define a partially bounded space wherein the workpiece can be held with respect to said cutting path.

23. The arrangement of claim 22 comprising: angle indicating means for indicating the angular position of said guide arm with respect to said cutting path.

24. The arrangement of claim 23 comprising adjustable securing means for adjustably securing said guide arm with respect to said track member at a desired angle.

25. The arrangement of claim 24, said angle indicating means including: a protractor on said guide arm for rotating therewith to provide an angle indication of the angular position of said guide arm with respect to said track member and said cutting path.

26. The arrangement of claim 25, said angle indicating means including: an indicator formed on said track member for indicating the angle on said protractor which said guide arm makes with respect to said cutting path.

27. The arrangement of claim 25, said supporting means comprising: brackets mounted on said track member at respective end portions thereof, said brackets being configured for insertion and clamping between said vise members to support said track member in spaced relation above said vise members; said track member, said guide arm and said vise members conjointly defining said partially bounded space wherein the workpiece can be held with respect to said cutting path.

28. The arrangement of claim 27 comprising: texture means formed on the base of said track member for frictionally engaging the workpiece when said track member is lowered with respect to said upper surface to firmly hold the workpiece in said cutting path.

29. The arrangement of claim 27 comprising: mounting means for holding the portable tool to said mounting sled, said mounting means comprising:
channel recess means formed in said mounting sled;
fasteners having a T-type head adapted for engaging said recess means with the head portion thereof so as to cause the remaining portion thereof to extend upwardly from the top surface of said mounting sled; and, holding brackets held to said sled by said fasteners for engaging and holding the tool securely to said sled.

30. The arrangement of claim 29 for a portable tool in the form of a router having a mounting attachment including two metal bars, said mounting sled having a ridge portion formed thereon on which the metal bars can be braced, said last-mentioned brackets being U-shaped to hook over and engage the metal bars, respectively, for securely holding the router to said sled.

31. The arrangement of claim 30 wherein a circular saw having a shoe is substituted for the router, said U-shaped brackets having one leg shorter than the other leg, said shorter leg being adapted to engage and hold the shoe securely to said sled.

* * * * *